United States Patent [19]

Mori et al.

[11] Patent Number: 5,197,131
[45] Date of Patent: Mar. 23, 1993

[54] INSTRUCTION BUFFER SYSTEM FOR SWITCHING EXECUTION OF CURRENT INSTRUCTION TO A BRANCH OR TO A RETURN FROM SUBROUTINE

[75] Inventors: Noriyasu Mori, Yokohama; Hiroshi Tomita, Kawasaki, both of Japan

[73] Assignee: Hitachi, Ltd., Tokyo, Japan

[21] Appl. No.: 307,501

[22] Filed: Feb. 8, 1989

[30] Foreign Application Priority Data

Feb. 10, 1988 [JP] Japan .................................. 63-27741

[51] Int. Cl.[5] .............................................. G06F 9/38
[52] U.S. Cl. ............................... 395/375; 364/246.3;
364/261.3; 364/262.4; 364/263.1; 364/DIG. 1
[58] Field of Search ... 364/200 MS File, 900 MS File;
395/375, 775

[56] References Cited

U.S. PATENT DOCUMENTS

| | | | |
|---|---|---|---|
| 4,500,959 | 2/1985 | Kubo et al. | 364/200 |
| 4,561,052 | 12/1985 | Tateno | 364/200 |
| 4,755,935 | 7/1988 | Davis et al. | 364/200 |
| 4,953,121 | 8/1990 | Muller | 364/900 |
| 4,974,154 | 11/1990 | Matsuo | 395/375 |

OTHER PUBLICATIONS

K. Sugashima et al. "Denshikeisanki no Hoshiki Sekkei" (Computer System Design), pp. 150–159, Computer Course 4, published by Sangyo Shuppan.

Primary Examiner—Thomas C. Lee
Assistant Examiner—Agni Mohamed
Attorney, Agent, or Firm—Antonelli, Terry, Stout & Kraus

[57] ABSTRACT

In an information processing system having an instruction buffer, an instruction buffer is controlled to primarily increase the instruction hit ratio of a sequence of instructions including a procedure-call instruction. In the first configuration, there is provided a mechanism which subdivides the instruction buffer into a plurality of instruction buffer banks so as to switch the instruction buffer bank to a current use in association with a dynamic procedure call, thereby improving the instruction hit ratio in the procedure call and in the return operation. In the second configuration, there are provided instruction words to subdivide and to control the instruction buffer such that the user can specify a method of controlling the instruction buffer. An instruction loop is captured efficiently and an arbitrary instruction sequence of a program is stored as a resident routine in the buffer so as to increase the instruction hit ratio.

13 Claims, 18 Drawing Sheets

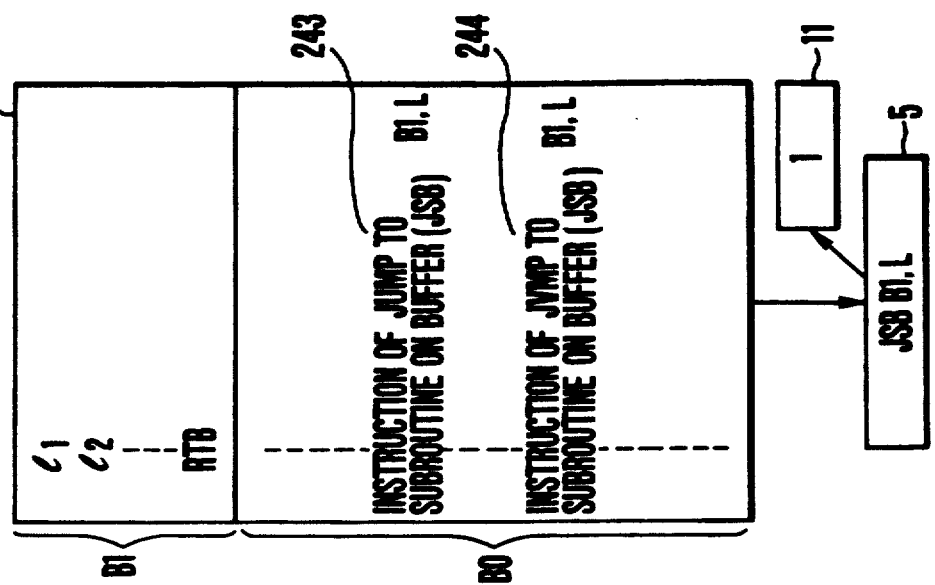
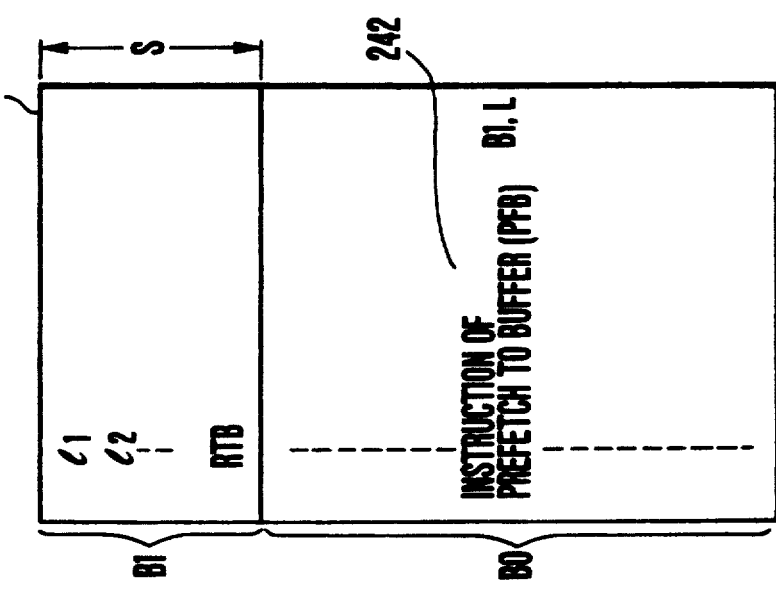
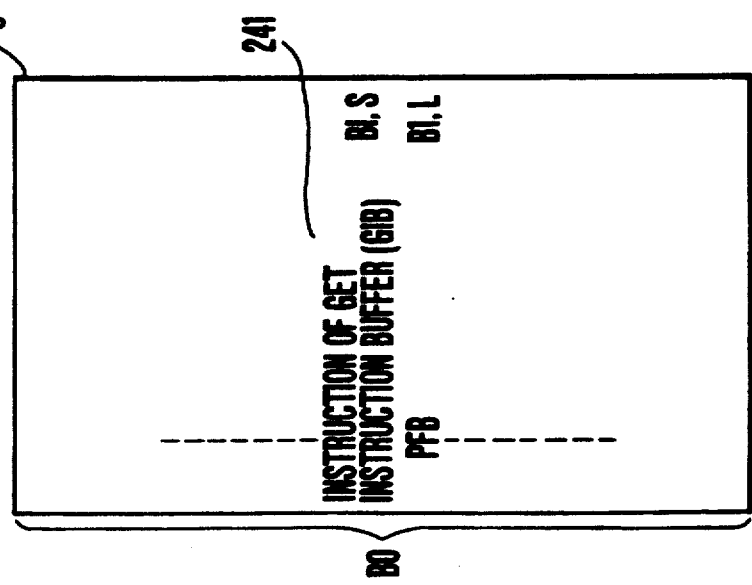

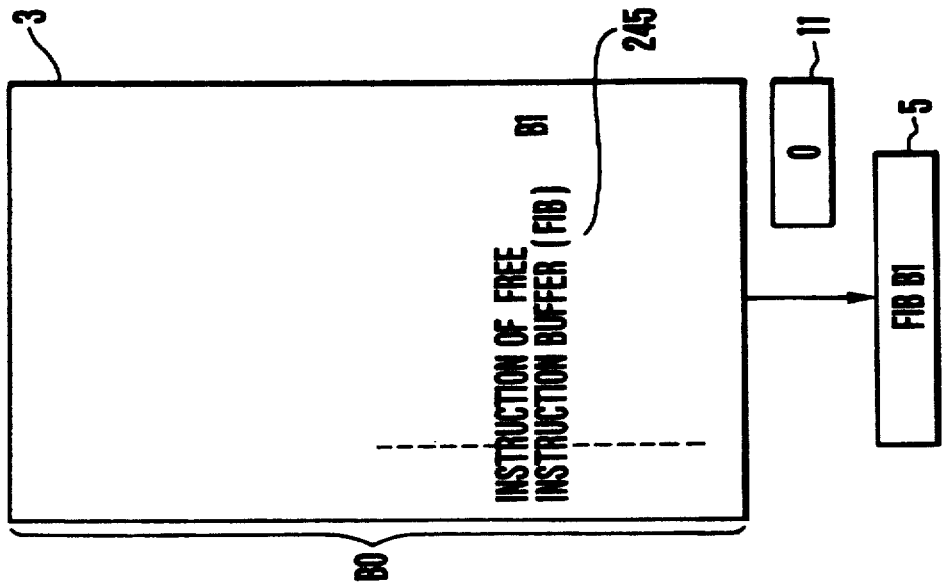
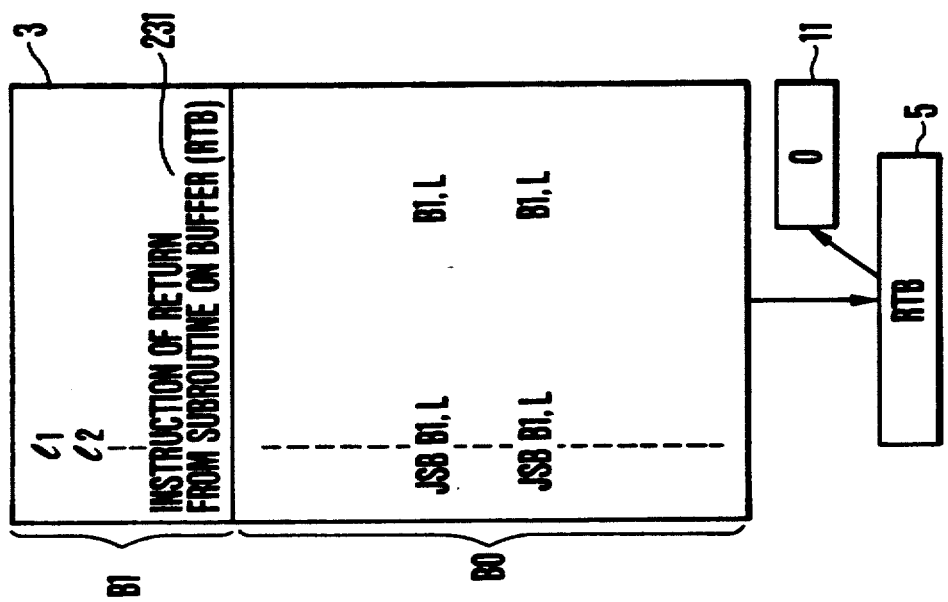

INSTRUCTION BUFFER SYSTEM FOR SWITCHING EXECUTION OF CURRENT INSTRUCTION TO A BRANCH OR TO A RETURN FROM SUBROUTINE

BACKGROUND OF THE INVENTION

The present invention relates to a program control apparatus in an information processing system, and in particular, to a control of an instruction buffer.

In order to increase the processing speed of an information processing system, an instruction buffer (described in pages 150–159 of the Computer Course 4 "Denshikeisanki no Hoshiki Sekkei (Computer System Design)" written by Kohzoh Sugashima, supervised by Hiroshi Inose, and published from Sangyo Shuppan) has been used. In an instruction buffer, a group of instructions which are to be used in a program currently being executed are previously read from a main memory and stored in a high-speed small capacity storage called an instruction buffer. Prefetching is used. As a result, the period of time necessary for a fetch operation of an instruction is reduced to improve the processing speed of the information processing system. Particularly, in a case where a sequence of instructions to be stored in the instruction buffer is to be iteratively executed in an instruction loop, a remarkable improvement is obtained in the second and subsequent iterations of the loop. In this case, since all instructions can be read out from the instruction buffer, the processing speed is efficiently increased. The operation above in which an instruction loop is completely loaded in the instruction buffer is called capture of an instruction loop.

The capture of the instruction loop is accomplished by sequentially replacing an old portion of the content of the instruction buffer with a new instructions read from the main memory for the next execution of the loop. An instruction replacement with a prefetch operation is carried out as a unit of instructions having a predetermined size or in a block of instructions. So long as the size of an instruction loop (the memory size of a group of instructions contained in the instruction loop) does not exceed the capacity of the instruction buffer, by sequentially replacing the old instructions not contained in the instruction loop with instructions contained in the loop, all instructions constituting the instruction loop are stored in the instruction buffer. The determination of an instruction block to be removed from the instruction buffer by replacement with a replacement algorithm has been commonly used. A method (First In First Out, FIFO) in which the replacement is conducted on an instruction block first stored in the instruction buffer as described above is used. Finally, a method (Least Recently Used, LRU) is used in which the instruction block least recently used is replaced.

In general instructions are arranged in the order of execution at consecutive addresses in the main storage. As a result, the prefetch operation is usually effected on a group of instructions at addresses subsequent to the address of an instruction currently being executed. This provision alone may achieve a considerable improvement. However, in a case where an instruction such as a conditional branch instruction, which may change the control flow exists in a sequence of instructions, there is a problem when the above method is employed. Namely, in the method described above, an instruction sequence to be executed when such a branch is not performed is previously prefetched. Each time the branch condition is satisfied and a branch is achieved, an instruction sequence at the branch target or destination is required to be read from the main memory. As a result, the improvement produced by the prefetch is greatly minimized. In order to satisfy this problem, a branch target instruction buffer has been utilized to prefetch therein a branch target instruction of the conditional branch instruction.

SUMMARY OF THE INVENTION

It is therefore an object of the present invention to efficiently control an instruction buffer for a branch operation of a program to increase the effectiveness of the instruction buffer for the program including a branch operation and a return operation without substantially increasing the capacity of the instruction buffer.

A branch target instruction buffer increases the processing speed of fetching an instruction in the execution of a branch operation. However, if the branch target routine or the called routine to be executed after the execution of the branch has a large size, a sequence of instructions of the calling routine are replaced by prefetching the instruction sequence of the called routine. As a result, when the calling routine is an instruction loop, it is sometimes impossible to capture an instruction loop which can be ordinarily captured, in case that the branch target instruction buffer is not used and the area in which the branch target instructions are buffered is included in the ordinary instruction buffer area. In addition, in a case of a program, other than an instruction loop, where control is returned to the calling routine after a called routine is executed, if a replacement is achieved of an instruction (subsequent to a branch instruction) at a return address prefetched in the calling routine and in a sequence of instructions subsequent thereto, it is necessary in a return operation to read these instructions again from the main memory, which leads to loss of the effectiveness of the prefetch operation.

This problem cannot be satisfactorily solved only through an increase of the capacity of the instruction buffer without increasing the capacity to an extremely large size. As a result, if the instruction buffer is large, a long period of time is required for an instruction retrieval such as for a check to determine a presence or absence of a predetermined instruction, which decreases the effectiveness of the instruction buffer.

According to one aspect of the present invention, the instruction buffer is subdivided into a plurality of regions which are controlled as an instruction buffer unit such that the instruction buffer operations of the instruction prefetch, replacement, and retrieval operations are independently accomplished in the respective regions. A circuit specifies one of these regions as a current region. A circuit changes the specification of the current region in response to an execution of a branch instruction. For example, the order of utilization or priority level of the plurality of regions are determined beforehand. When a procedure-call instruction (in which a branch takes place after an address subsequent to the procedure-call instruction address is specified as a return address) is executed, a region having a utilization level next to that of the current region is specified. When a return instruction (in which a branch takes place to the return address specified by the procedure-call instruction) is executed, a region having a utilization level prior to that of the current region is specified. The priority levels may be specified in a loop such that the last level returns to the first level.

According to this configuration, the current region within the instruction buffer of the instruction is changed in response to an execution of a branch instruction. The instruction of the calling routine stored in the old current region is retained and thus not replaced with an instruction of the called routine. As a result, even when control is returned to the calling routine after execution of the called routine, the instruction at the return address which is prefetched into the old current region can be immediately read from the old current region. Furthermore, for an instruction loop including a procedure-call instruction, if the size of the instruction loop allows the loop to be loaded in a region, it is possible to accomplish the capture operation regardless of the size of a procedure to be called. By changing the current region in a reverse order with respect to the utilization priority order by use of a procedure-call instruction and a return instruction, the advantageous features described above can be easily utilized.

According to another aspect of the present invention, an instruction specifies an inhibit region allocated in any part of the instruction buffer and an instruction specifies transferring a specified instruction sequence to the inhibit region. In addition, when necessary, a branch instruction is provided for which an inhibit region is to be specified after a branch (for example, a procedure-call instruction and a return instruction) and an instruction is provided to release the inhibit region. In a region specified by the branch instruction, when the next instruction indicated by an instruction address register for subsequent execution cannot be found as a result of an instruction search in a region specified by the branch instruction and when it is found that the next instruction to be executed is missing in the region (that is, a mishit takes place), the buffer control apparatus uses a region for which the inhibit region is not specified. In addition, when the specification of the inhibit region is omitted, the branch instruction uses regions for which the replacement is not prohibited and the operation is executed as if the regions for which the replacement is not prohibited are explicitly specified.

According to this configuration, it is possible to reserve a region of appropriate size by use of an inhibit region specify instruction and then to transfer a routine to be iteratively processed (for example, a system library) from the main memory thereto. As a result, the routine is retained in the instruction buffer and is not erased by a replace operation. A call operation of this routine and a return therefrom can be accomplished by use of the procedure-call instruction associated with the region specification and the return instruction, respectively. When this routine becomes unnecessary, the region can be returned to the replaceable region by use of an instruction to release the inhibit region.

BRIEF DESCRIPTION OF THE DRAWINGS

The present invention will be apparent from the following detailed description taken in conjunction with the accompanying which:

FIGS. 16 and 17(a)–17(e) are schematic diagrams showing processes in which a system library is loaded in an instruction buffer as resident software for use.

DESCRIPTION OF THE PREFERRED EMBODIMENTS

Figure 1:
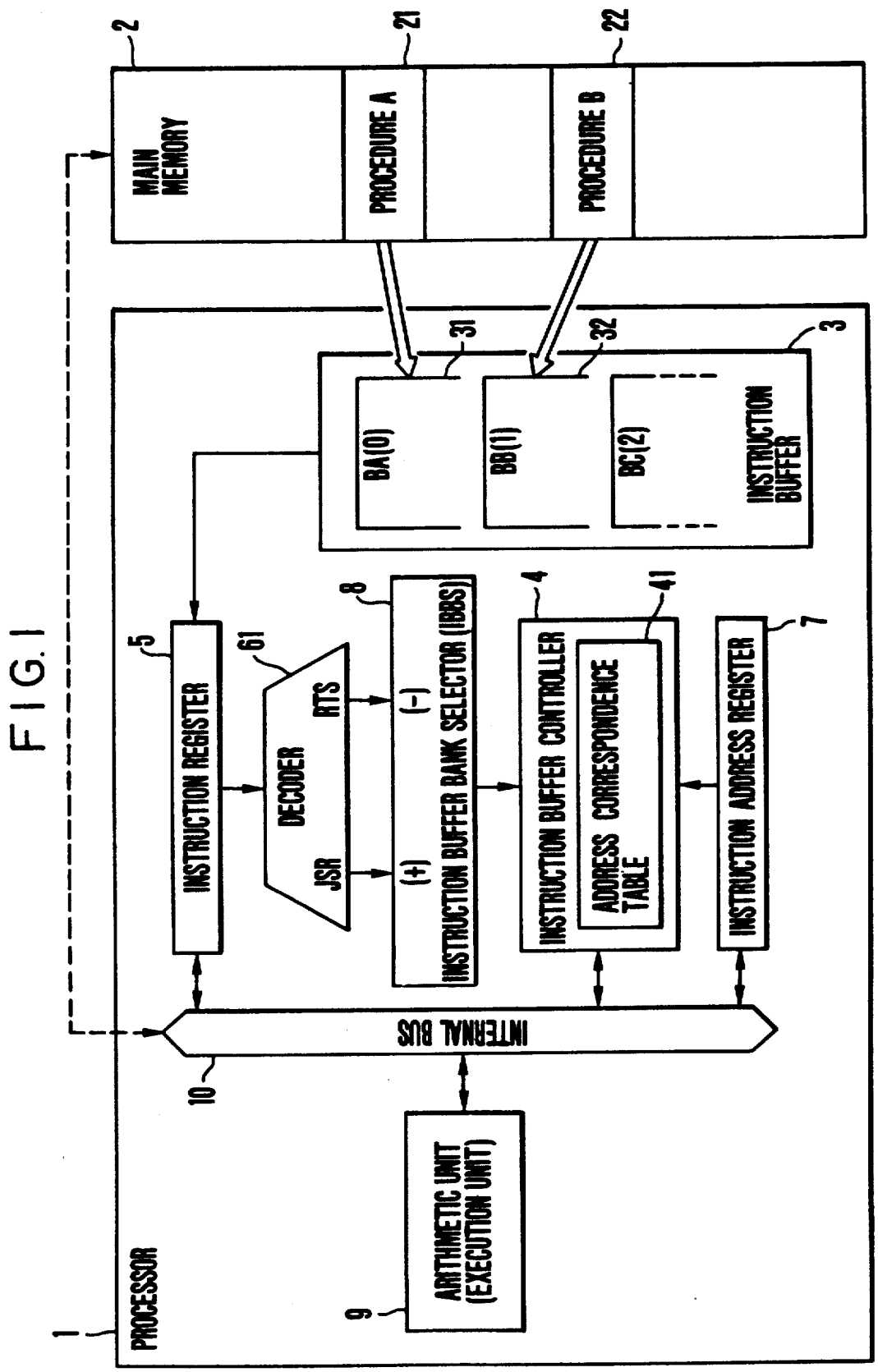
FIG. 1 is a schematic diagram showing a configuration of an embodiment according to the present invention.

FIG. 1 is a block diagram showing an information processing system including an embodiment according to the present invention. This system comprises a processor 1 and a main memory 2. The processor 1 briefly includes an arithmetic unit 9 and a program control section respectively connected to an internal bus 10. The program control section includes an instruction register 5, an instruction decoder 61, an instruction address register 7, an instruction buffer 3, and an instruction buffer controller 4. The internal bus 10 is connected, as indicated by means of dotted lines in FIG. 1, via an appropriate interface and an external bus to the main storage 2.

The instruction address register 7 is also called a program counter and is updated through a known method so as to keep an address of a next instruction to be subsequently executed. In an instruction fetch cycle, the instruction controller 4 fetches the content of the instruction address register 7, namely, the address of the next instruction to be executed.

A write operation of an instruction into the instruction buffer 3 (at a prefetch or replace operation) is accomplished in a unit called a block. That is, in order to increase the transfer efficiency between the instruction buffer 3 in the processor 1 and the main memory 2, the instructions are to be transferred in a batch of a predetermined block size (which allows several instructions to be stored in the block in many cases). The block is the transfer unit applied to the transfer between the main memory 2 and the instruction buffer 3 (however, a read operation of an instruction from the instruction buffer 3 into the instruction register 5 is achieved in the instruction word unit).

In the following description, it is assumed that the prefetch of an instruction into the instruction buffer 3 and the replacement of an instruction therein are accomplished in the block unit and that a group of instructions stored in the block unit is called an instruction block.

The instruction controller 4 includes an address correspondence table 41, which is also called a directory or a tag array. The address correspondence table 41 keeps information which indicates, for each block of the instruction buffer 3 as the instruction store unit, in address of instructions of the block stored in the main memory 2.

The decoder 61 decodes an instruction in the instruction register 5 so as to supply necessary control signals to components, for example, the arithmetic unit 9 during the execution of the instruction. While the instruction is being decoded and is being executed respectively in the decoder 61 and the arithmetic unit 9, the instruction buffer controller 4 sequentially prefetches the subsequent instructions at the address next to the address of the main memory 2 at which the instruction currently being executed is stored and then loads the prefetched instructions in the instruction buffer 3.

Figure 2:
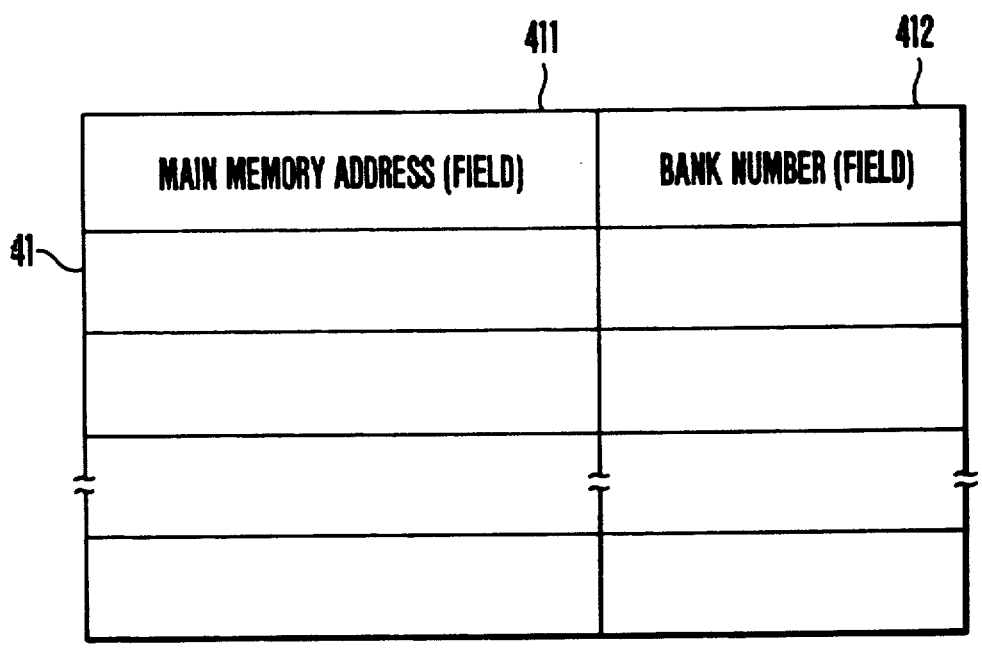
FIG. 2 is a diagram for explaining an address correspondence table.

The instruction buffer 3 is beforehand subdivided into a plurality of banks (BA 31, BA 32, etc.) each having a predetermined size and being equivalent to an independent instruction buffer with respect to the buffer operation. That is, the operations of the buffer for the instruction retrieve, prefetch, and replace processing are respectively accomplished in a bank specified as the current bank at the pertinent point of time. In order to identify each bank, the address correspondence table 4; contains information, as shown in FIG. 2, indicating banks to which the respective instruction blocks belong. In FIG. 2, each entry or row of the address correspondence table 41 is beforehand associated with an instruction block of the instruction buffer 3. The entry includes a main memory address field 411 containing a main memory address at which the instruction block to be stored in the corresponding block is stored in the main memory 2 and a bank number field 412 containing a number of a bank to which the block belongs.

In order to specify the current instruction buffer bank at the respective points of time, there is disposed an instruction buffer bank selector (IBBS) 8, which may be an up-down counter having a capacity not less than the total number of the instruction buffer banks. As will be described later, the current bank is switched by incrementing or decrementing the content thereof by one. The increment or decrement operation is continued even when an overflow or underflow takes place. Assuming, here that the total number of banks is M (namely, bank 0 to bank M-1), when an incrementation is performed while the bank M-1 is being specified, the bank 0 is specified; or, when a decrementation occurs while the bank 0 is being specified, the bank M-1 is specified. Through the cyclic usage of the instruction buffer banks as described above, it is possible to effectively utilize the instruction buffer 3 as if it did not have a large capacity.

Figure 3:
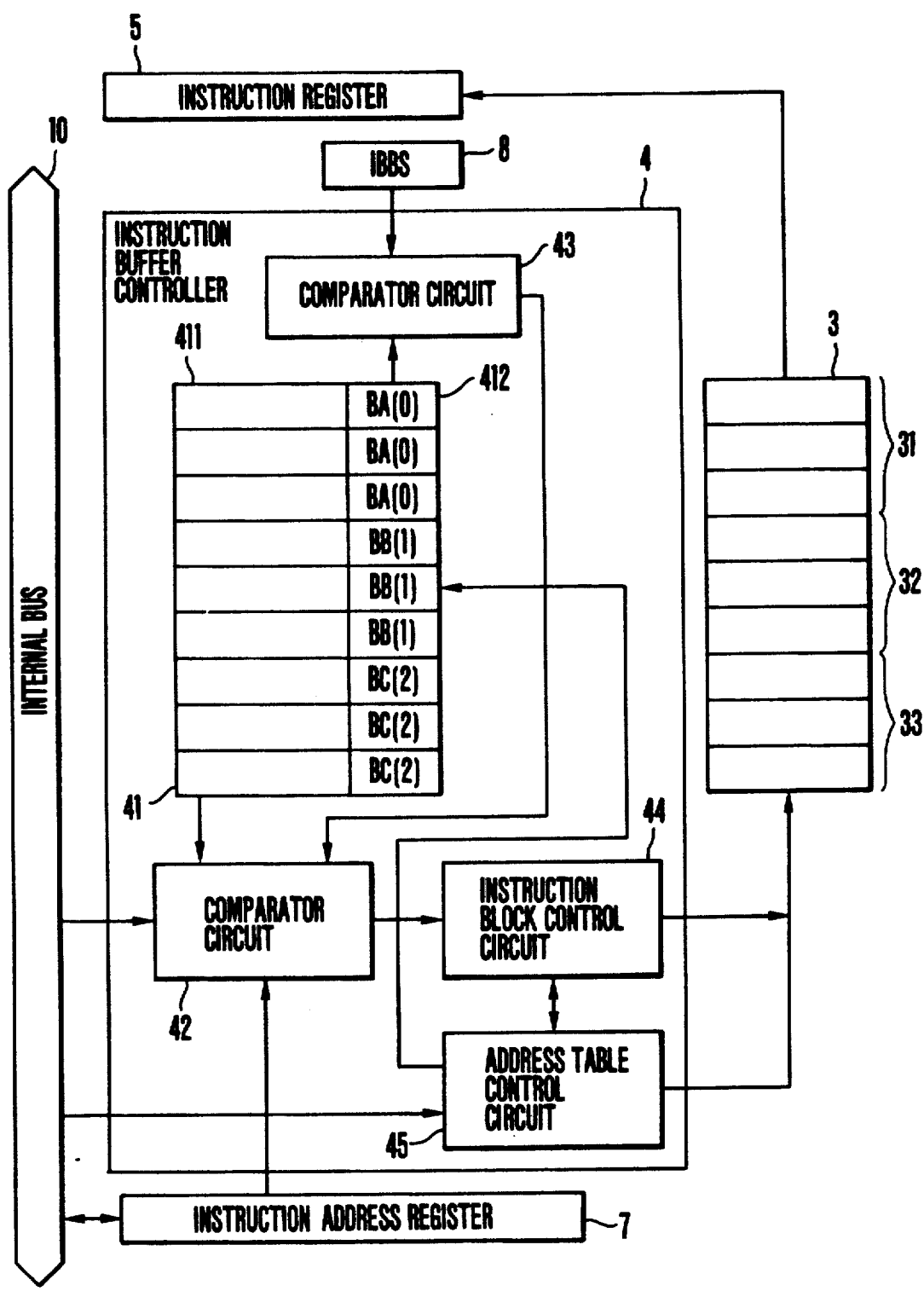
FIG. 3 is a diagram showing in detail a portion of the configuration of FIG. 1.

FIG. 3 shows the configuration of the instruction buffer controller 4 and the periphery thereof. The instruction buffer 3 is subdivided into three instruction buffer banks 31 to 33 each including three instruction blocks. The address corresponding table 41 has as many entries as there are instruction blocks. In the example of FIG. 3, the number of instruction blocks is three. Furthermore, there is established a one-to-one correspondence between the instruction blocks and the entries of the address correspondence table 41. The main memory address field 411 of the address correspondence table 41 is employed to store an address of the main memory 2. The address to be stored therein is the address of the main memory 2 indicating the first position of an instruction group stored in an instruction block corresponding thereto. The content of the bank number field 412 indicates the number of the associated instruction buffer bank. In FIG. 3, the number BA(0) of the instruction buffer bank 31 is loaded in the corresponding bank number field. In this example, since the instruction buffer bank 31 is subdivided into three instruction blocks, BA(0) is stored in three entries of the address correspondence table 41. This is also the case for the instruction buffer banks 32 and 33.

The instruction buffer controller 4 includes a comparator circuit 42 comparing the content of the main memory address field 411 and the prefetch (fetch) address, a comparator circuit 43 comparing an output from the IBBS and the content of the bank number field 412, an instruction block control circuit 44 capable of writing an instruction in an arbitrary instruction block of the instruction buffer 3 based on the results from the comparator circuits 42 and 43, and an address table control circuit 45 preserving integrity associated with the entry of the address correspondence table 41 and the corresponding instruction block. Description will next be given of the instruction buffer controller 4 in the instruction fetch and prefetch operations.

In the instruction fetch operation, a check is conducted to determine whether or not an address of the next instruction stored in the instruction address register 7 exists in the instruction buffer 3. If this is the case, an instruction is delivered from the instruction buffer 3 to the instruction register 5; otherwise, an instruction word is read from the main memory 2 and one of the instruction blocks of the instruction buffer 3 is replaced therewith, and then the instruction is fed to the instruction address. Thus, a retrieval and a replacement on the instruction buffer 3 occurs. The operations above are represented in a flowchart of FIG. 4.

First, for an instruction search, all entries are checked in the address correspondence table 41 (step 101). In the address correspondence table 41, the respective entries are sequentially checked by means of the address table controller 45 (step 102). For the entry not retrieved before, a comparison is achieved between the bank number field 412 thereof and the IBBS 8 (step 103). If these items are identical to each other as a result of the comparison, the entry is assumed to be associated with the instruction block of the current buffer bank. As a result, a decision is made to determine whether or not the instruction block corresponding to this entry includes an instruction which is the object of the fetch operation (step 104). This judgement is conducted through a comparison achieved by the address compare circuit 42 between the main memory address field 411 and the instruction address register 7. If these addresses are equal to each other, it is determined that a desired instruction (a fetch object) exists in the instruction block associated with the entry of the address correspondence table 41 presently being checked (this is called a hit). This condition is notified to the instruction block controller 44, which then obtains the instruction from the corresponding instruction block and sends the instruction to the instruction register (step 105). If the hit does not take place when the check is completed through the entries of the address correspondence table 41, instructions are read in the block unit from the main memory 2 via the external bus and the internal bus 10 (step 106) so as to be stored through the instruction block control circuit 44 in the instruction buffer 3 (step 107). In this situation, the selection of the instruction block for the replacement is accomplished, like in the case of the instruction retrieval, through the judgement of the bank comparator circuit 43 so as to perform the operation only for the current buffer bank. That is, the address table control circuit 45 causes the bank comparator circuit 43 to select an instruction block as a replacement object (according to the replacement algorithm) based on the entry of the address correspondence table 41 associated with the current buffer bank such that the main memory address field 412 of the entry corresponding to the instruction block to be replaced is loaded with the address of the obtained instruction in the main memory 2 and that at the same time, a replacement is achieved on the instruction block corresponding to the entry.

Figure 4:
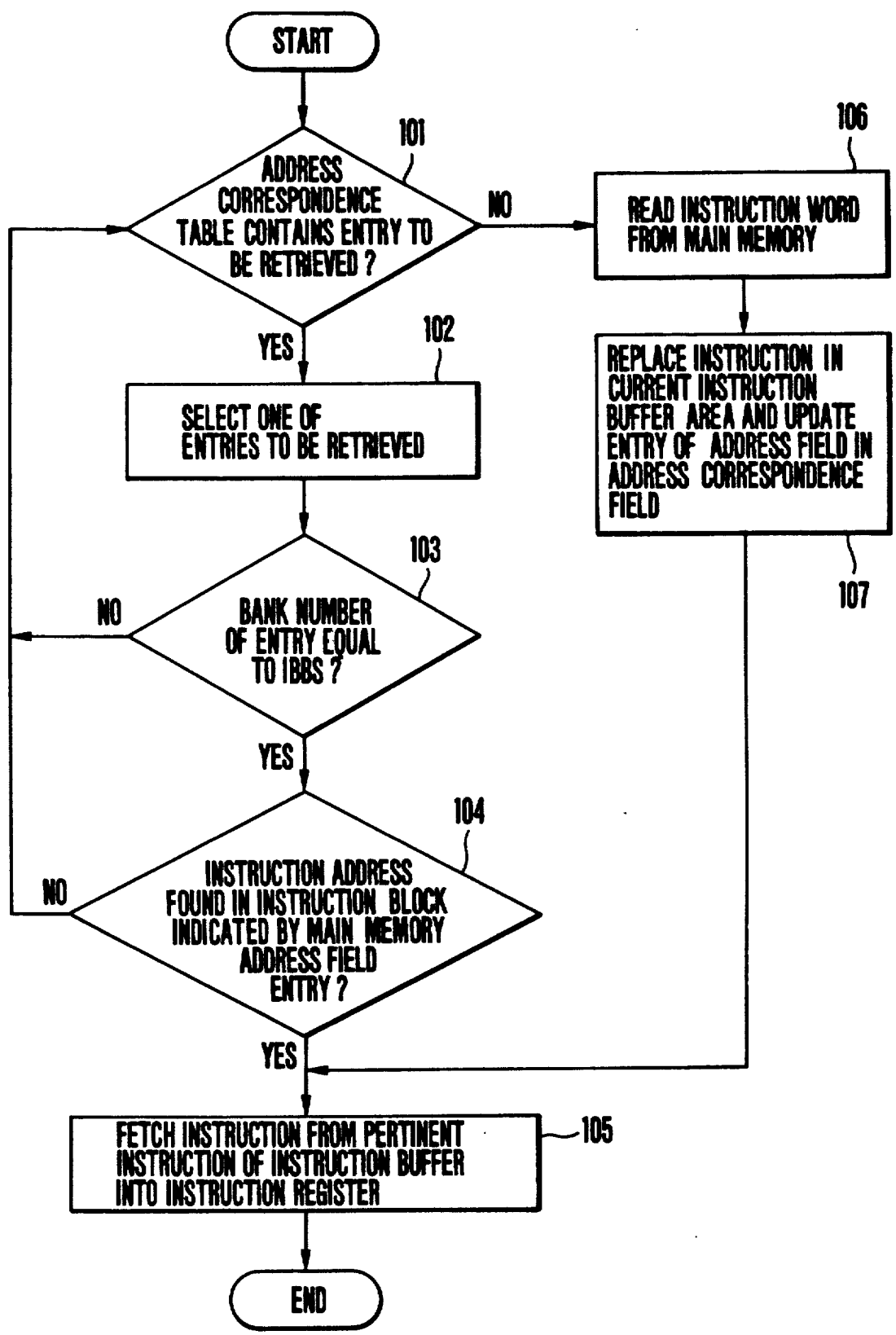
FIG. 4 is a flowchart showing the instruction fetch operation and the instruction buffer retrieve and replace operations.

Also in a case of an instruction prefetch operation, the similar processing is achieved as described above. However, the processing of the step 105 of FIG. 4 is not executed. The fetch operation on the instruction register is not effected. In addition, as the different point, in the address compare operation at the step 104, the address comparator circuit 42 directly receives from the internal bus an address computed by adding a value equivalent to several steps to the value of the instruction address register 7 so as to employ this address value for the comparison.

The increment and decrement operations of the IBBS 8 are carried out respectively in response to a branch instruction for a procedure call which is named as a JSR instruction in this embodiment and a branch instruction for a return to the original procedure which is called an RTS instruction in this embodiment. The JSR instruction contains an address specification <ea> which saves the content of the instruction address register 7. Namely, an address of the instruction which will be executed after the procedure-call to the top of the stack and the transfer of control to the address <ea>. On the other hand, the RTS instruction does not contain an address specification and specifies a control transfer to an address represented by data contained in the top field of the stack. As a result, by locating the RTS instruction at an appropriate position in a branch target routine of the JSR instruction, it is possible to return therefrom to an instruction subsequent to the JSR instruction. According to the present invention, the JSR instruction specifies an incrementation of the IBBS 8 and the RTS instruction specifies a decrementation of the IBBS 8. As a result, in association with the call of a procedure and the return therefrom, the switch operation to the next instruction buffer bank and the return to the previous instruction buffer bank are automatically accomplished.

Figure 5:
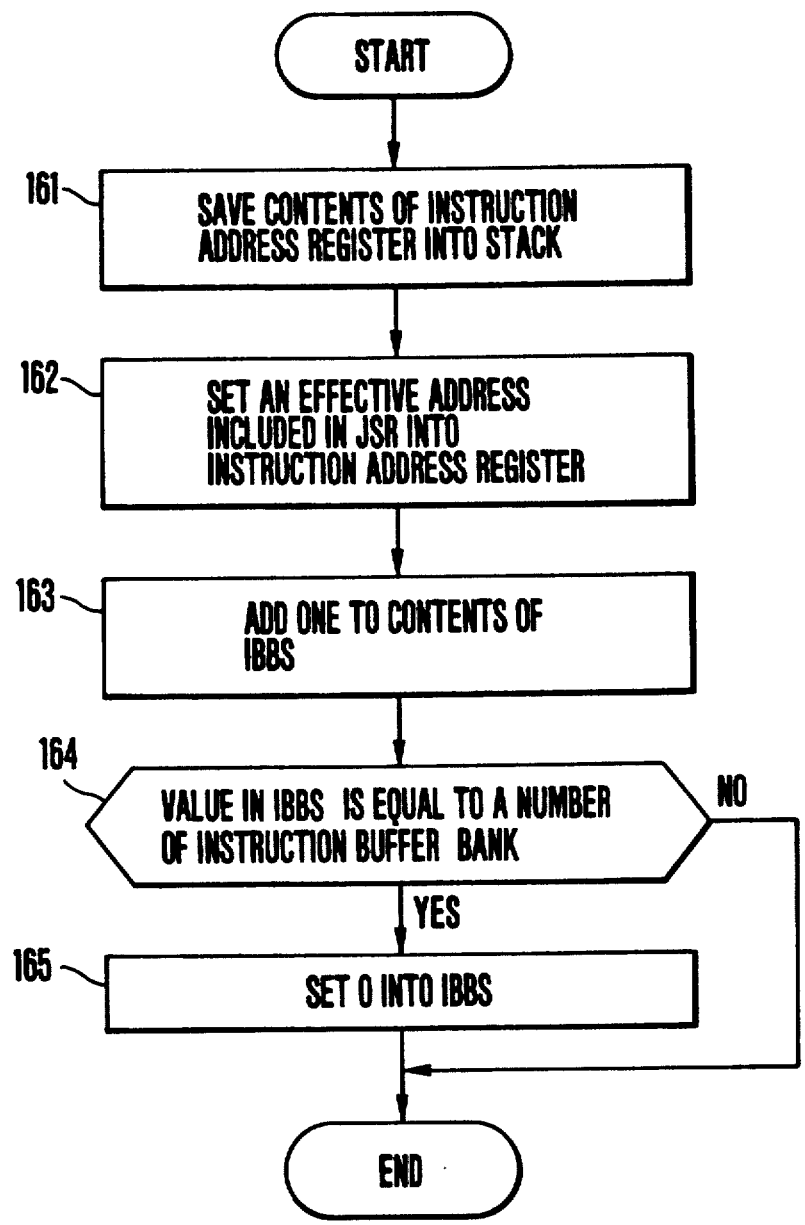
FIG. 5 is a flowchart showing an operation of a Jump to Subroutine (JSR) instruction according to the present invention.

FIG. 5 shows a flowchart useful to explain the operation of the JSR instruction according to the present invention. Steps 161 and 162 achieve processing which is identical to the processing of a branch instruction for a procedure call employed in the prior art. In this instruction however the content of the IBBS 8 is incremented by one (step 163). At step 164 it is determined if the content of the IBBS 8 after the incrementation is equal to the number of the instruction buffer bank. If this is the case, a value of 0 is set to the IBBS 8 (step 165) so as to cause the instruction buffer bank switch operation to continue change of the identification of the current instruction buffer bank.

Figure 6:
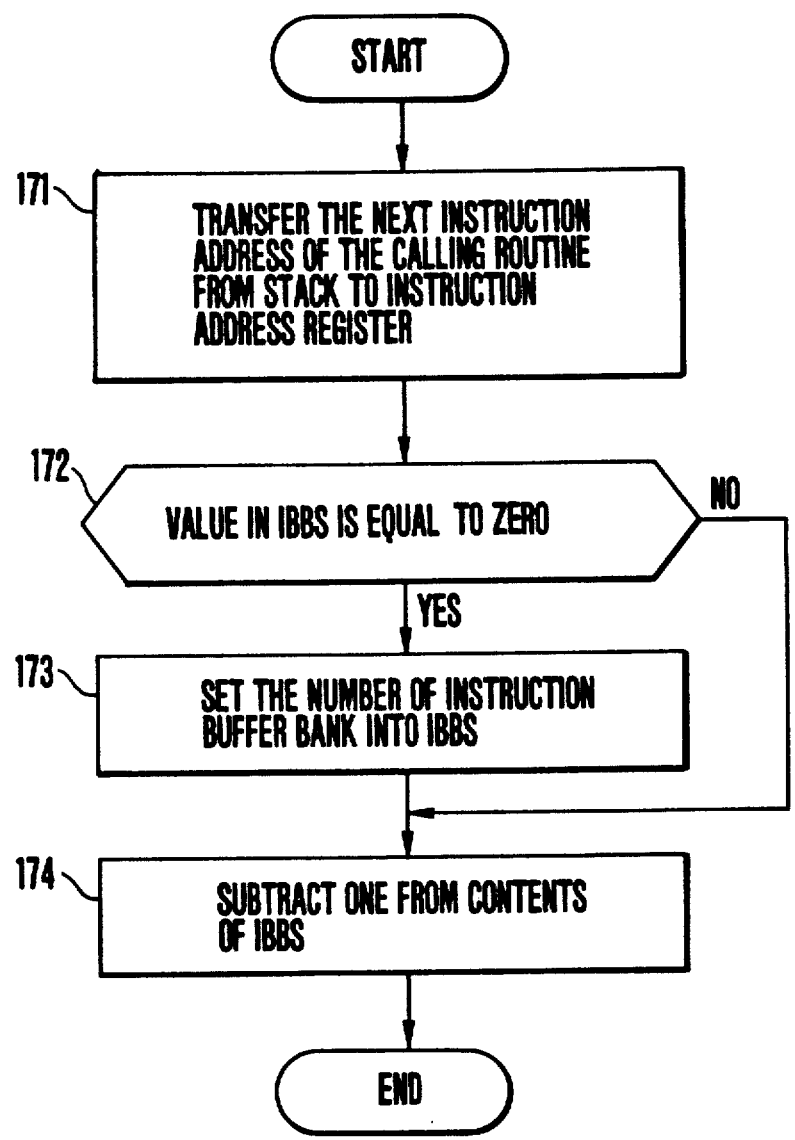
FIG. 6 is a flowchart showing an operation of a Return from Subroutine (RTS) instruction according to the present invention.

FIG. 6 is a flowchart for explaining the RTS instruction according to the present invention. Step 17 achieves processing equivalent to the processing of a procedure return instruction in the prior art. In this instruction, furthermore, at step 172 a check is conducted to determine if the current value of the IBBS 8 is equal to 0 (step 172). If this is the case, at step 173 the number of instruction buffer bank is set in the IBBS 8. Finally, at step 174 the content of the IBBS 8 is decremented to continue change of the identification of the current instruction buffered bank.

Figure 7:
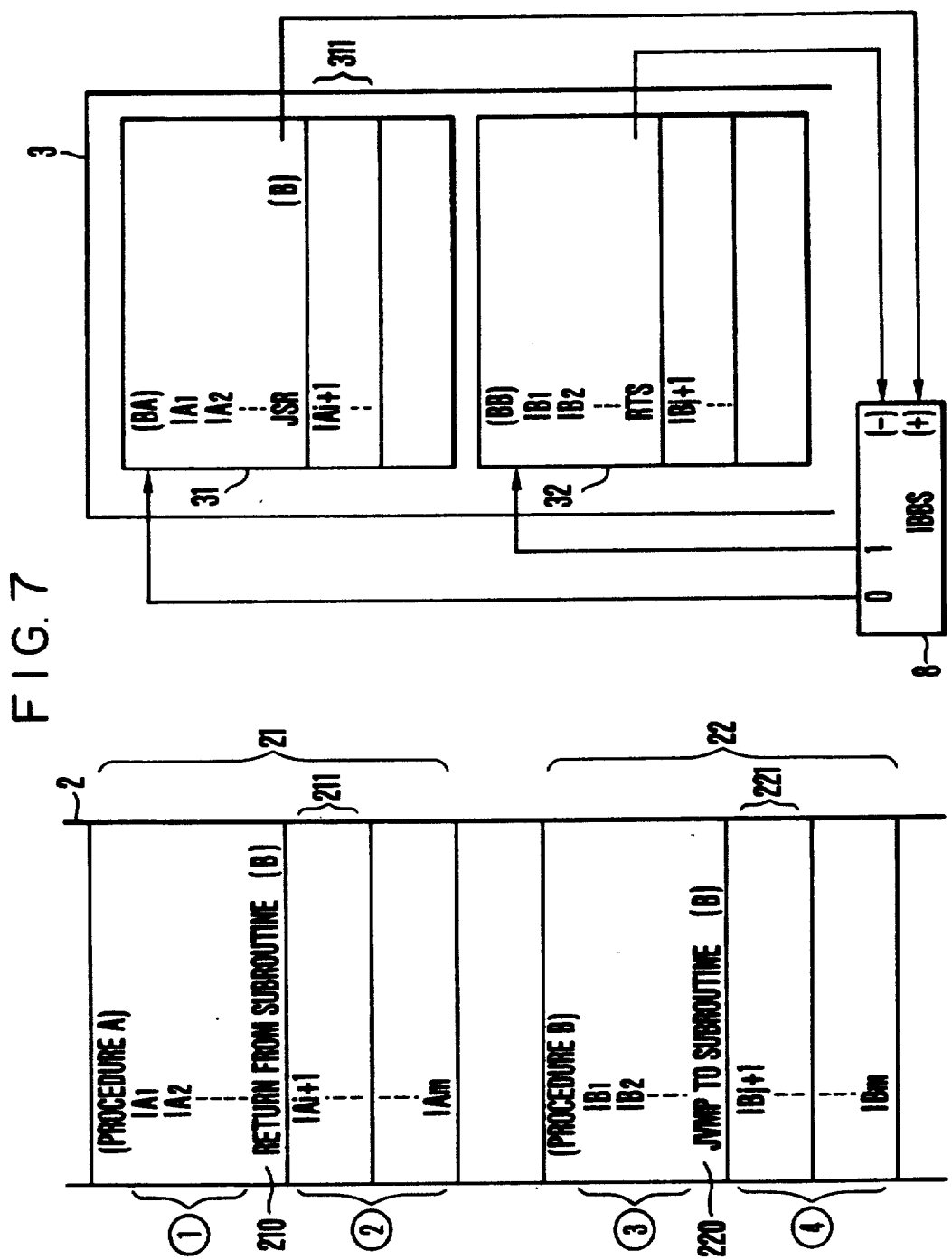
FIG. 7 is an explanatory diagram for explaining a switch or process of instruction buffer banks.
Figure 8:
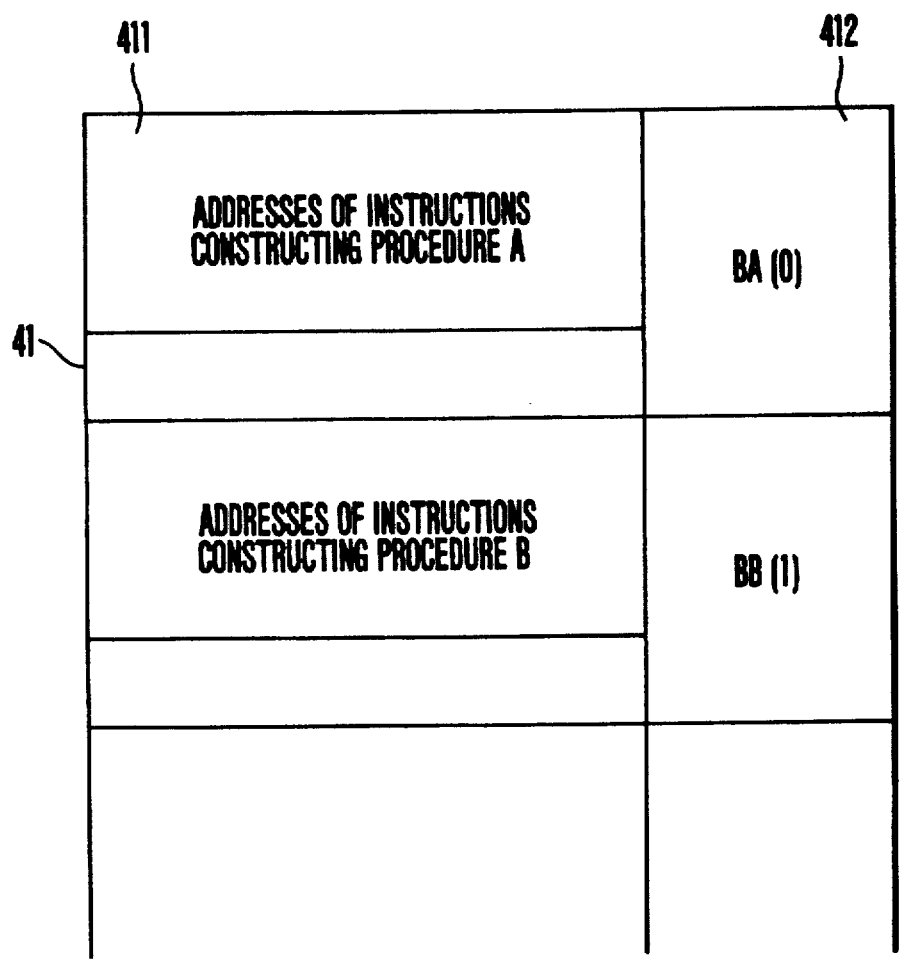
FIG. 8 is a diagram showing the content of an address correspondence table 41 in a switch process of FIG. 7.

FIG. 7 schematically shows an example of a switch operation procedure in which the instruction buffer banks are switched in the embodiment of FIG. 1. In the example of FIG. 7, a procedure A 21 calls a procedure B 22 and thereafter a control return is accomplished from the procedure B 22 to the procedure A 21. The procedure A 21 includes n instructions $IA_1$ to $IA_n$ and a JSR instruction 210 is included as the i-th instruction. On the other hand, the procedure B 22 includes m instructions $IB_1$ to $IB_m$ and an RTS instruction 220 as the j-th instruction. As a result, these instructions are executed in the following sequence.

$IA_1 IA_2, \ldots IA_{i-1}$, JSR, $IB_1, IB_2 \ldots IB_{j-1}$,
RTS, $IA_{i+1}, \ldots IA_n$ Representing these instructions in groups as
$IA_1 - IA_{i-1}$: ①
$IA_{i+1} - IA_n$: ②
$IB_1 - IB_{j-1}$: ③
$IB_{j+1} - IB_m$: ④

These instructions are executed in the following order. ①, JSR, ③, RTS, ②

In the initial state, the IBBS 8 is reset to 0 and hence specifies the 0-th instruction buffer bank A 31. As a result, the instruction buffer bank A 31 is used during the execution of the instruction group ①. That is, the instruction retrieve, prefetch, and replace operations to be accomplished by the instruction buffer control unit 4 are performed only in the instruction buffer bank A 31. The other instruction buffer bank are not used at all. As the execution of the instruction group ① proceeds, the prefetch operation on the instruction buffer bank A 31 is progressively achieved. When the JSR instruction 210 is requested, a hit takes place in the instruction buffer bank A 31. By this point of time, the first portion 211 of the instruction group ② has already been prefetched (311) into the instruction buffer bank A 31.

When the JSR instruction 210 is executed, the value of the IBBS 8 is incremented to "1" so as to indicate the first instruction buffer bank B 32. As a result, the branch target instruction group ③ of the JSR instruction is prefetched into the instruction buffer bank B 32. At the point where the RTS instruction 220 is requested, a hit occurs in the instruction buffer bank B 32. By this point of time, the first portion 221 of the instruction group ④ has already been prefetched into the instruction buffer bank A 32.

When the RST instruction 220 is executed, the value of IBBS 8 is then decremented to "0" so as to indicate again the instruction buffer bank A 31. At this point, the first portion 311 of the instruction group ② previously prefetched at the execution of the JSR instruction is preserved in the instruction buffer bank A 31. As a result, for the branch target instruction $IA_{i+1}$ specified via the stack by means of the RST instruction 220, a hit takes place in the instruction buffer bank A 31, and then the instruction is immediately transferred to the instruction register 5 for execution. Thereafter, the portion of the instruction group ② not prefetched yet is then sequentially prefetched into the instruction buffer bank A 31. FIG. B shows the content of the address correspondence table 41 in the operation processes above.

In the program example of FIG. 7, when the execution of the instruction group ② initiated by the RTS instruction is completed, the program is finished. As a result, the first portion of the instruction group ④ prefetched into the instruction buffer bank B 32 is not used. However, in general, there exists a chance for such a portion to be utilized. For example, the RTS instruction 220 may possibly skipped by a conditional branch instruction in the instruction group ③.

If an instruction is provided which alters the content of the bank number field 412 of the address correspondence table 41, it is possible to prepare a bank-having an arbitrary size or an arbitrary number of banks. Alternatively, in place of providing the bank number field in the address correspondence table 41, instruction buffer banks and a bank unit may be provided for each bank including a group of entries of an address correspondence table associated with the instruction buffer bank such that the bank units respectively perform buffer operations and the instruction buffer control apparatus causes the bank units to be selectively operated depending on the value of the IBBS 8. According to this type of structure, it is difficult to specify the number of the instruction buffer banks and the capacity thereof by use of instruction words and therefore the flexibility is not sufficient. However, the range which may be subjected to the hit check and replacement can be localized for each bank unit. In order to determine the object to be subjected to the hit check and the replacement, it is not necessary to achieve the search operation through all buffer regions which simplifies the operation. In addition, since the instruction retrieval object is minimized, a satisfactory processing speed is developed.

Figure 9:
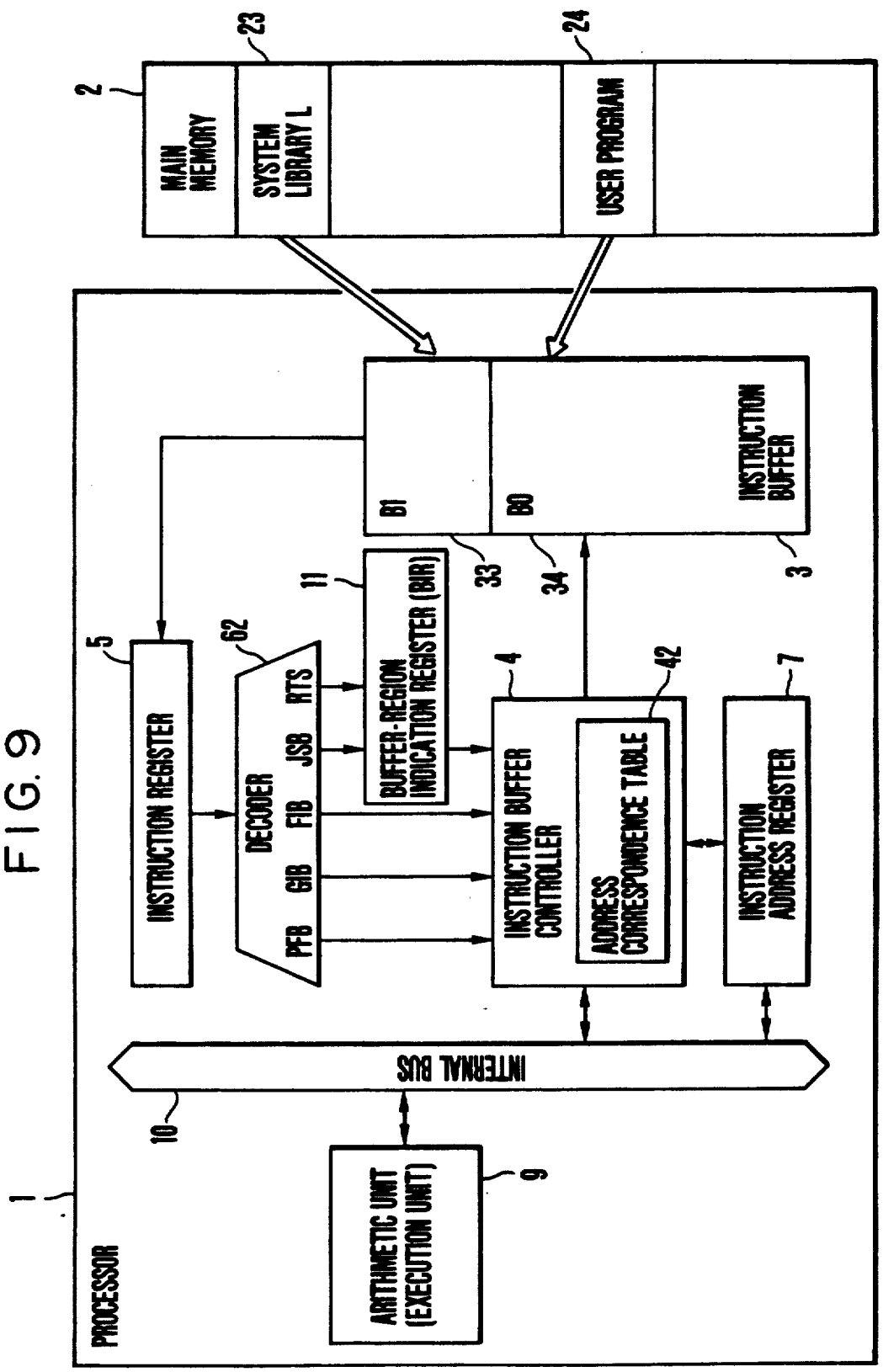
FIG. 9 is a diagram showing a configuration of another embodiment according to the present invention.

FIG. 9 shows an information processing system including another embodiment according to the present invention. Like reference numerals identify like parts in FIGS. 1 and 9. In this embodiment, a group of particular instructions is provided to reserve an arbitrary number of regions in the instruction buffer 3 to remove the particular regions from replacement. Furthermore, in order to specify the current particular region, buffer region indication register (BIR) 11 is provided.

Figure 10:
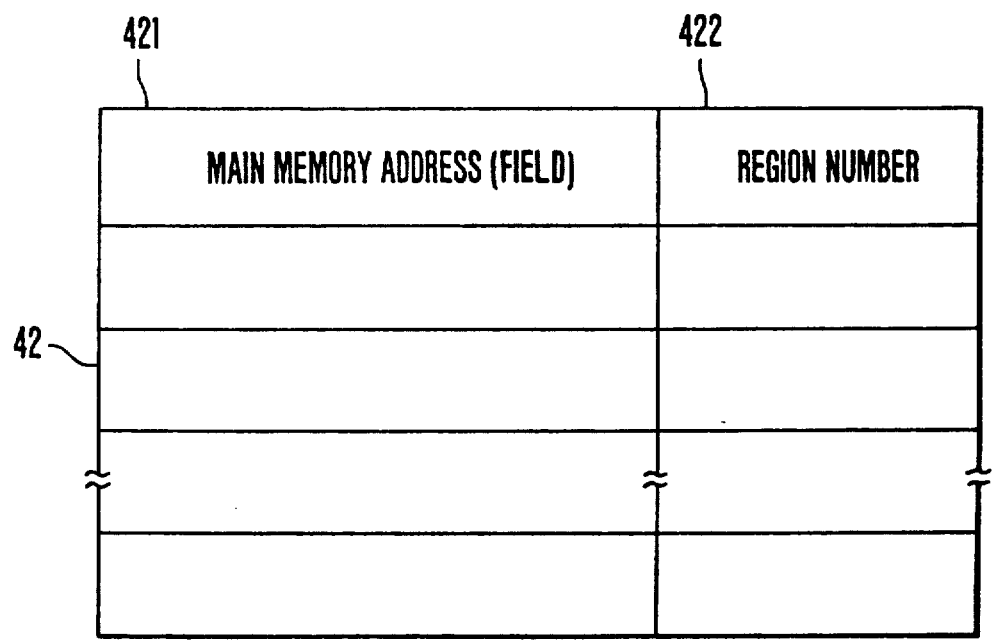
FIG. 10 is a diagram showing an address correspondence table in the embodiment of FIG. 9.

For identification of the respective particular regions, the address correspondence table 42 includes a region number field 422, as shown in FIG. 10, so as to write therein an identification number of the region to which the pertinent block belongs. The main memory address field 421 is equivalent to the main memory address field 411 (FIG. 2) in the first embodiment. An instruction block associated with the region number field 422 containing "0" does not belong to any particular region and is therefore replaceable. However, for an instruction block associated with the region number field 422 containing other than "0", the replacement operation is inhibited. That is, the values other than "0" in the region number field 422 also function as a replacement inhibit flag. In the following description, a region with a number n is represented as $B_n$.

The internal configuration of the instruction buffer control apparatus is similar to that of FIG. 4 excepting the following points. That is, BIR 11 is used in place of IBBS 8 and the different instructions ar recognized by the instruction decoder 62. Moreover, an address correspondence table 42 contains a region number 422 in place of the instruction buffer bank number 412. This region number field 422 is not beforehand loaded with a number. However, as an initial state, a value of 0 is set in field 422 by the user or the operating system. The buffer control instructions (to be described later) of this embodiment are implemented by means of microprograms. The instruction buffer controller 4 controls the instruction buffer 3 depending on the content of BIR 11. That is, the instruction buffer controller 4, on receiving an address of an instruction to be executed by use of the instruction address register 7, searches for the requested address in the entries of the address correspondence table 42 for which the content of the region number field 422 matches with that of the BIR 11. If such an address is present, the instruction is transferred from the corresponding instruction block to the instruction register 5. On the other hand, if the requested address is missing, the instruction buffer controller 4 conducts a search operation in the region B0 which is not specified as a particular region. If the requested address is also missing in the B0 region, the instruction is read in the block unit from the main memory 2 by use of the pertinent address so as to be written in the region B0 and to be transferred to the instruction register 5. In the write operation of the instruction block in the region B0, a replace operation is carried out when necessary. The access above to the region B0 does not alter the content of the BIR 11.

In order to reserve, to use, and to free the particular regions of the instruction buffer 3, there are provided the following instructions according to this embodiment. Items in [ ]are mnemonics of the assembler.

(i) Instruction of Get Instruction Buffer: GIB

[GIB $B_n$, S]

This instruction is employed to reserve a particular region $B_n$ in the instruction buffer 3 and to assign a region number n thereto. In response to this instruction, the instruction buffer controller 4 selects entries having "0" in the region number field 422 from the address correspondence table 42 with the number of entries corresponding to the specified size S. Thereafter, the region number field 422 is loaded with "n".

Figure 11:
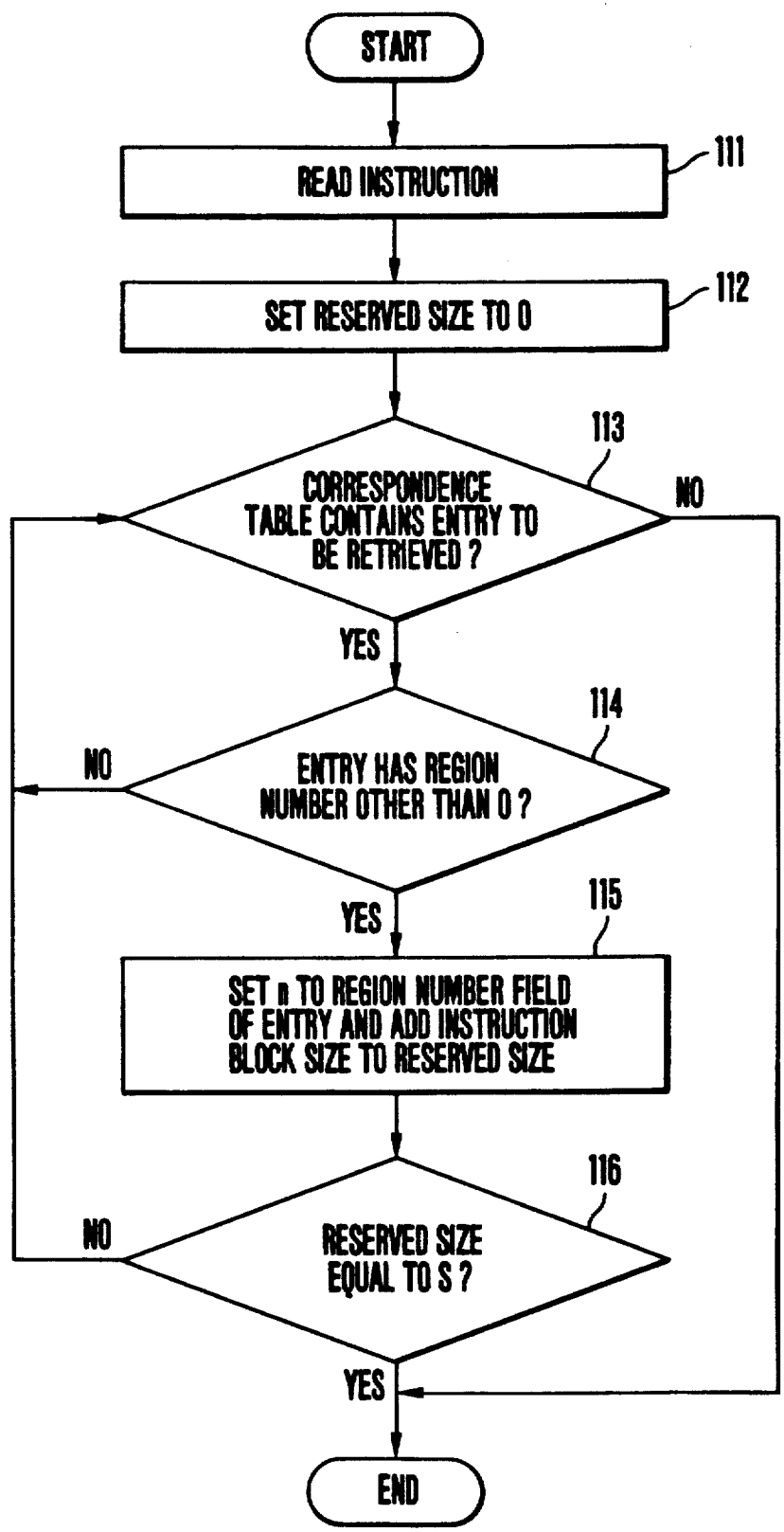
FIG. 11 is a flowchart showing an operation of a Get Instruction Buffer (GIB) instruction according to the present invention.

FIG. 11 is a flowchart for explaining the operation of the GIB instruction, which is implemented by means of a microprogram having a reserved size as an internal control variable. First, the instruction is read (step 111), and then a value of 0 is set to the reserved size (step 112) to perform the initialization. Subsequently, a check is achieved to determine if the address correspondence table 42 includes any entry not retrieved (step 113). If this is the case, the program determines if the region number field 422 of the entry contains 0 (step 114). If the value is other than 0, the corresponding instruction block has already been specified as a particular region for which the replacement is inhibited and therefore control returns to the step 113 so perform the retrieval operation of the other entries. If it is found at step 114 that the instruction block belongs to a replaceable region (not a particular region), the number n specified by the operand of the instruction is set to the region number field 422 of the entry and then the instruction block size is added to the reserved size (step 115). Thereafter, a check is carried out to determine if the reserved size is equal to the size S of the particular region to be reserved (step 116). If the size is identical, the processing is terminated. Otherwise, control is passed to the step 113 to continue the retrieval of the other entries.

(ii) Instruction of Prefetch to Buffer: PFB
[PFB $B_n$, <ea>]

This instruction is used to transfer to an instruction buffer region $B_n$ an instruction group of a size S beginning from an address <ea> of the main memory 2. In response to this instruction, the specified instruction group is transferred to an instruction buffer block group corresponding to a group of entries of the address correspondence table 42, each entry having the region number field containing "n".

Figure 12:
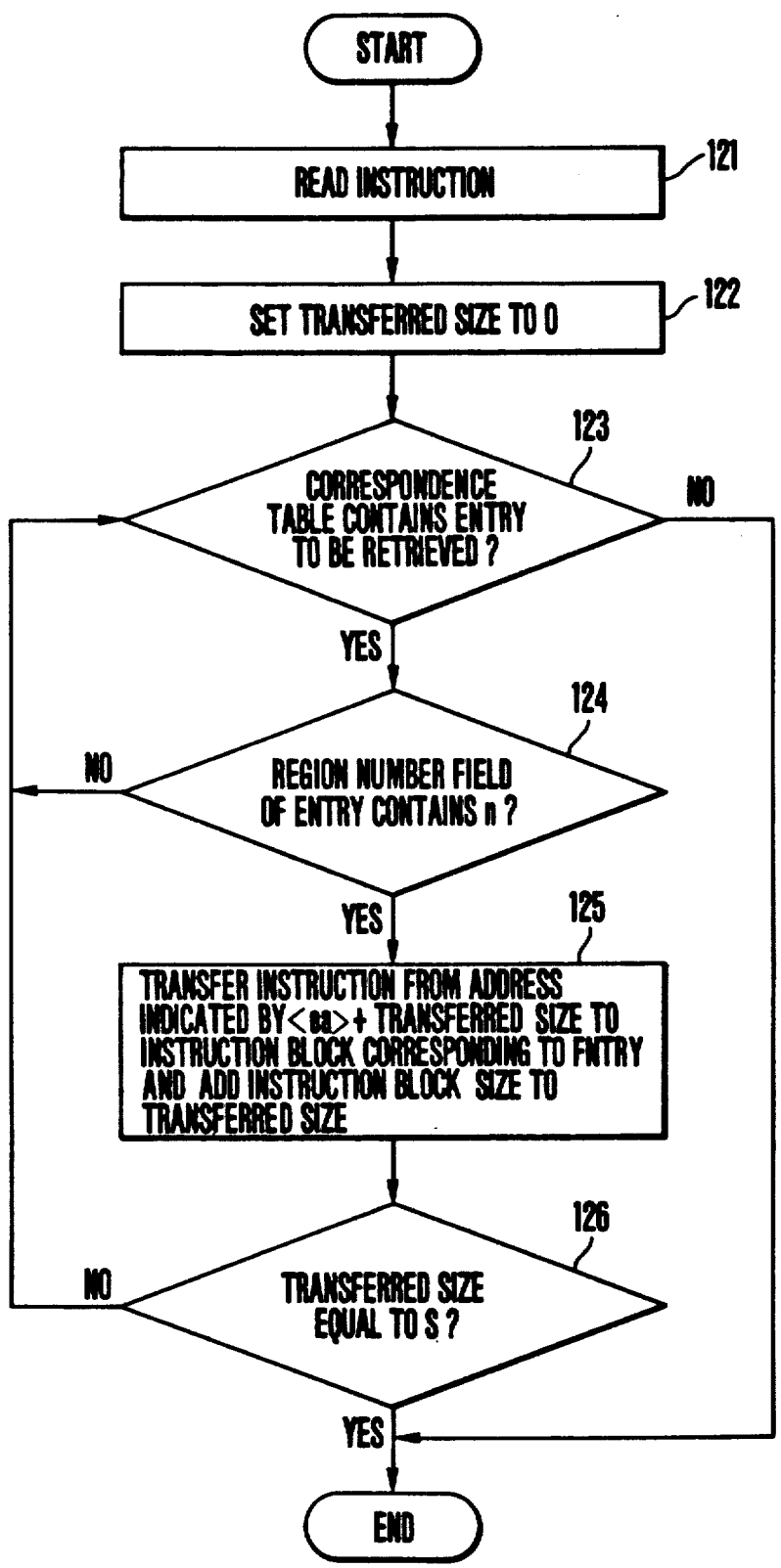
FIG. 12 is a flowchart showing an operation of a Prefetch to Buffer (PFB) instruction according to the present invention.

FIG. 12 is a flowchart for explaining the operation of the PFB instruction. This instruction is implemented by a microprogram having a transferred size as an internal control variable. The transferred size has a function like the reserved size in the case of the GIB instruction (FIG. 11). First, the instruction is read (step 121), and 0 is set to the transferred size (step 122), thereby achieving the initialization. Subsequently, a check is conducted to determine if the address correspondence table 42 contains any entry not retrieved yet (step 123). If this is the case, the entry region number field 422 thereof is judged to determine if the content is n (step 123). If the value is n, it is found that the entry corresponds to the instruction block to be prefetched. As a result, instructions are read from the main memory 2 beginning from an address equal to <ea> transferred size so as to be delivered to the instruction block associated with the entry and then the size of the transferred instruction block is added to the transferred instruction size (step 125). Thereafter, a check is made to determine whether or not the transferred size is equal to the size S specified for the transfer (step 126) The processing is terminated if the transferred size is identical to the size S. If a "No" results at steps 124 or 126, control is passed to the step 123 so as to process the next entry not retrieved. This processing is continued for all entries not retrieved.

(iii) Instruction of Jump to Subroutine on Buffer: JSB
[JSB $B_n$, <ea>]

This instruction is provided to store the content (return address) of the instruction address register 7 in the top field of the stack to branch to an instruction having a main memory address <ea> and to specify an instruction buffer region $B_n$ from which the instruction is fetched after the branch is completed. When this instruction is executed, "n" is set to BIR 11. If the specification of $B_n$ is omitted, it is assumed that BO is specified and hence "O" is set to BIR 11.

Figure 13:
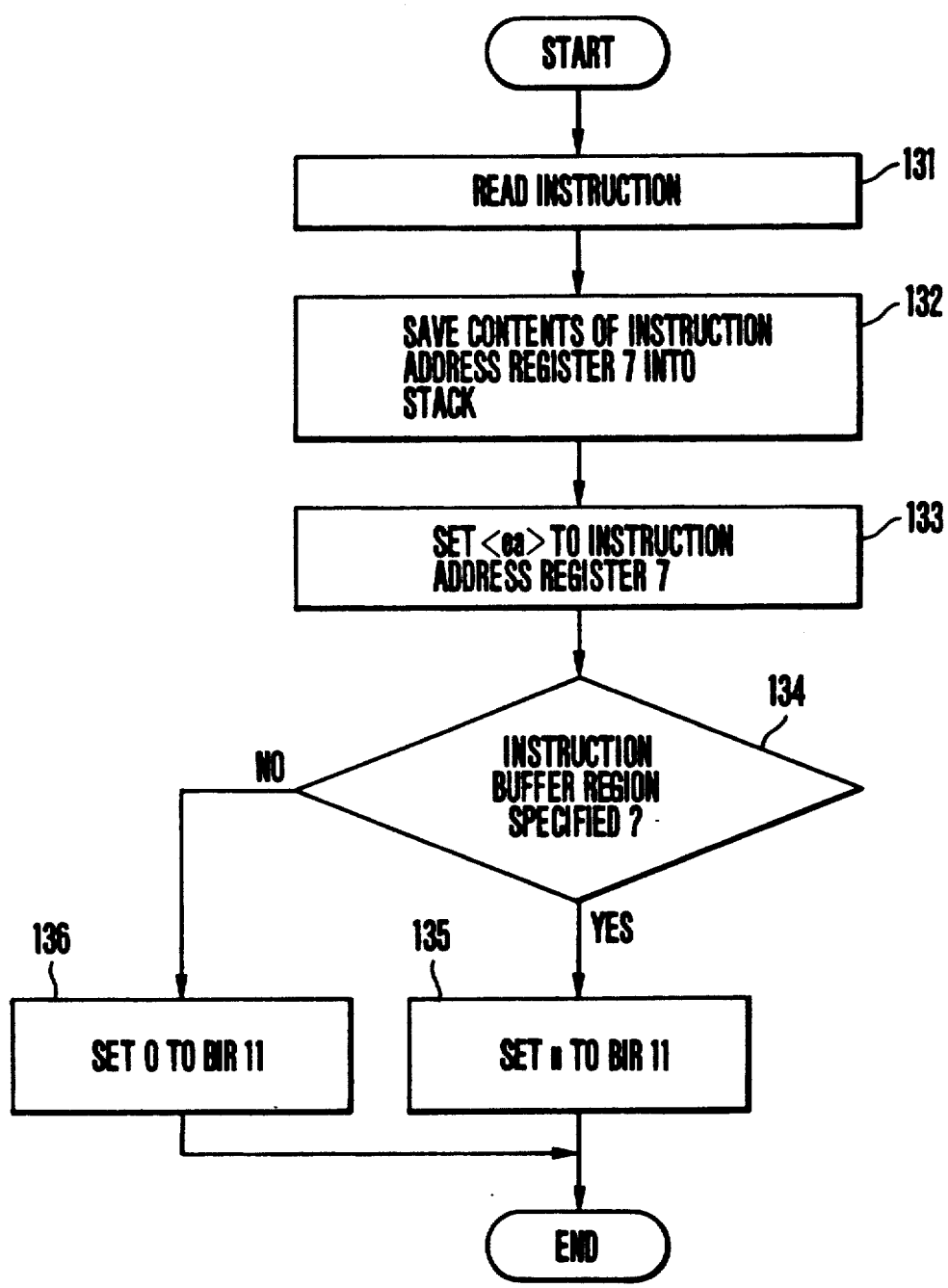
FIG. 13 is a flowchart showing an operation of a Jump to Subroutine Buffer (JSB) instruction according to the present invention.

FIG. 13 is a flowchart useful to explain the operation of the JSB instruction, which is also implemented by means of a microprogram. First, the instruction is read (step 131) and then steps 132 and 133 are performed producing processing similar to the processing of a branch instruction for a procedure call employed in the prior art. Subsequently, a check is conducted to determine if a specification of an instruction buffer region is present (step 134). If the specification is found, the region number n is set to BIR 11 (step 135), thereby terminating the processing. Otherwise, the default value is assumed resulting in a region number 0 being set to BIR (step 136) and then the processing is terminated.

(iv) Instruction of Return from Subroutine on Buffer: RTB
[RTB $B_n$]

This instruction is provided to branch to an instruction having an address contained in the top field of the stack and to specify an instruction buffer region $B_n$ from which the instruction is fetched after the branch is completed. When this instruction is executed, "n" is set to BIR 11. If the specification of $B_n$ is omitted, the same effect is developed as that achieved in the case of the JSB instruction.

Figure 14:
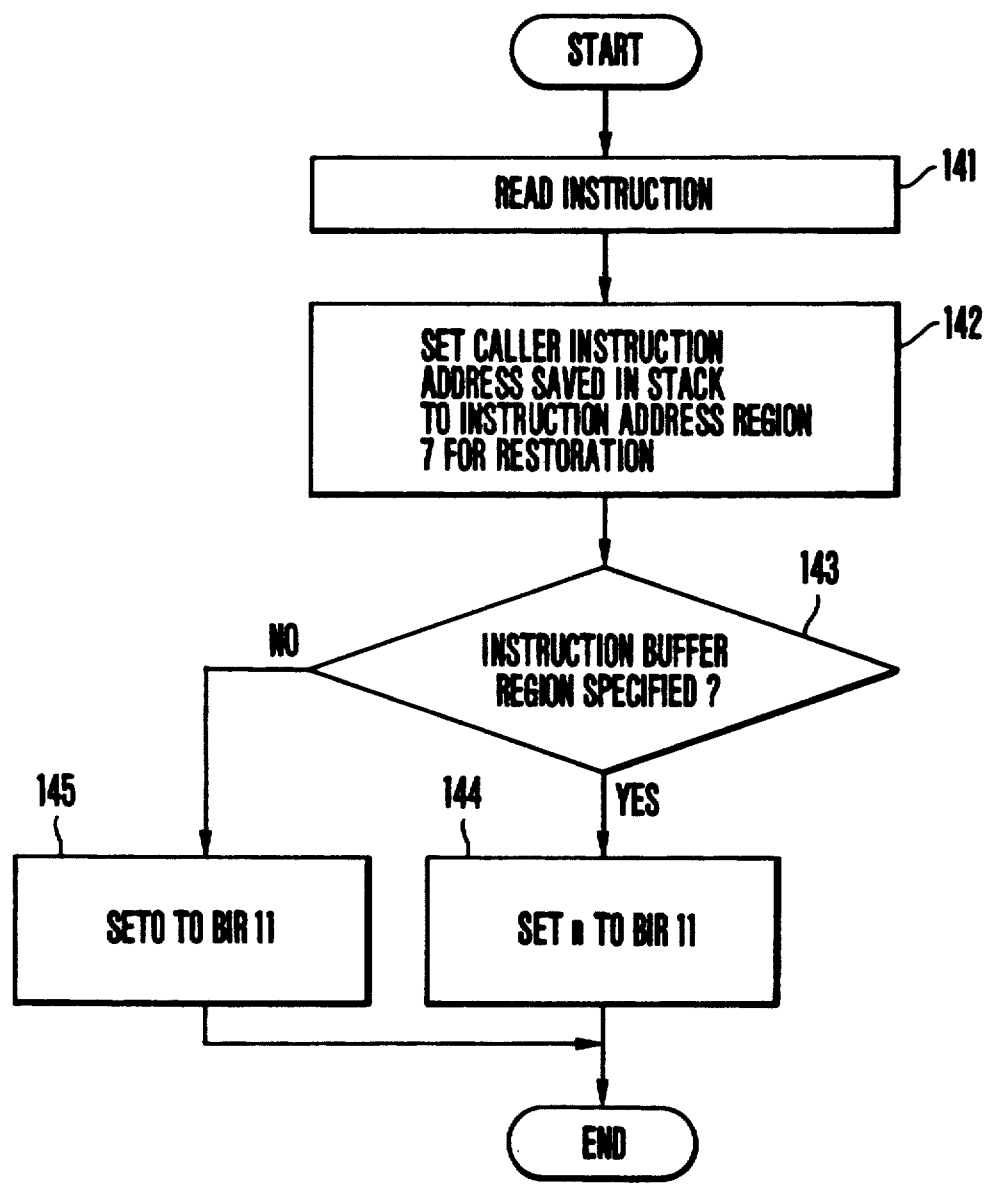
FIG. 14 is a flowchart showing an operation of a Return from Subroutine on Buffer (RTB) instruction according to the present invention.

FIG. 14 is a flowchart useful to explain the operation of the RTB instruction, which is also implemented by means of a microprogram. First, the instruction is read (step 141) and then step 142 is performed to resulting in processing similar to the processing of an instruction for a procedure return employed in the prior art. Subsequently, a check is conducted to determine whether or not a specification of an instruction buffer region is present (step 143). If the specification is found, the region number n is set to BIR 11 (step 134). Otherwise, a value of 0 is set to BIR (step 136).

(v) Instruction of Free Instruction Buffer: FIB
[FIB $B_n$]

This instruction is used to free the specification of the particular region $B_n$ so as to incorporate the region in BO. In response to this instruction, the instruction buffer controller 4 checks the address correspondence table 42 and then resets all region number fields each containing "n" to "0".

Figure 15:
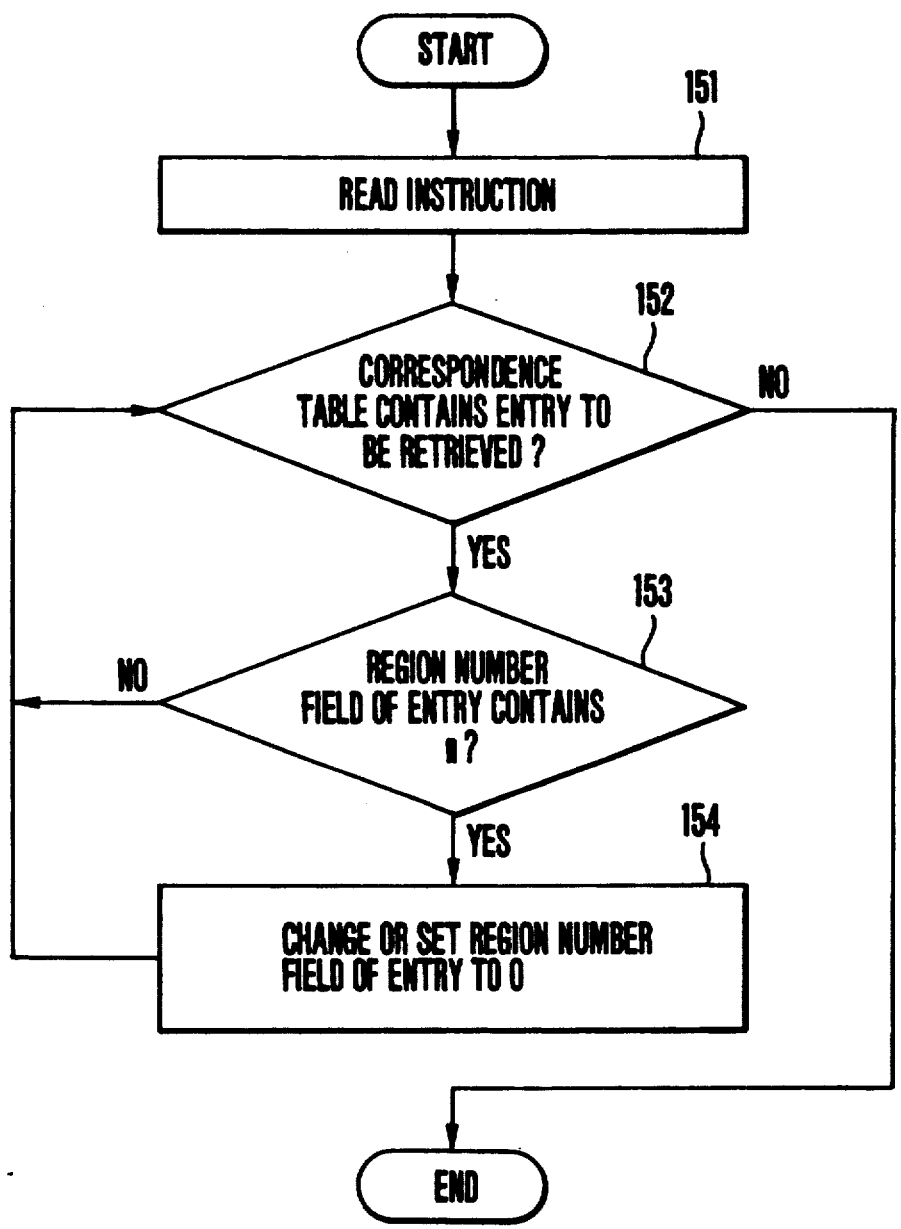
FIG. 15 is a flowchart showing an operation of a Free Instruction Buffer (FIB) instruction according to the present invention.

FIG. 15 is a flowchart useful to explain the operation of the FIB instruction, which is also implemented by means of a microprogram. First, the instruction is read (step 151) and then a check is achieved to determine if the address correspondence table 42 contains any entry not retrieved yet (step 152). If this is the case, a judgement is made to determine if the region number field 422 of the entry contains a value identical to the region number n specified by the instruction (step 153). If a matching occurs in the step 153, 0 is set to the region number field of the entry (step 154) enabling the replacement of the instruction block associated to this entry. (That is, this particular region with the region number n is incorporated into an ordinary region with a region number 0.) If the matching does not take place in the step 153, the region is a particular region having another region number (other than n). As a result, the processing of the step 152 is executed to process the next entry not retrieved. When the retrieval is completed for all entries of the address correspondence table 42, the processing is terminated.

According to the embodiment above, a necessary routine can be set as a resident program in the instruction buffer 3. As an example, description will be given of a process in which the system library L 23 is set as a resident program in the instruction buffer 3 with reference to FIGS. 16 and 17.

Figure 16:
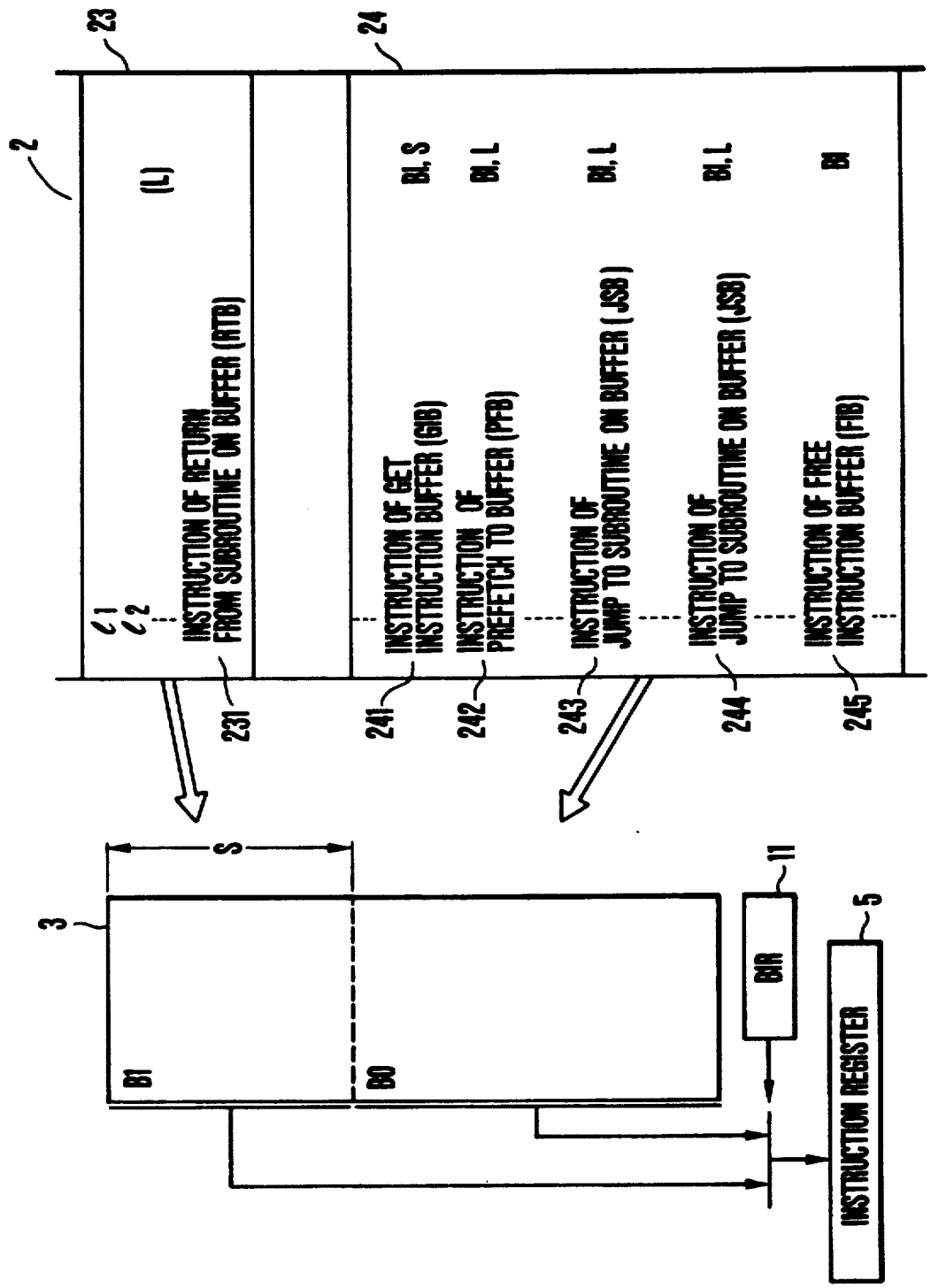

As shown in FIG. 16, a user program 24 in th main memory 2 includes a GIB instruction 241, a PFB instruction 242, JSB instruction 243 and 244, and an FIB instruction 245 respectively inserted as required. On the other hand, the system library L 23 in the main memory 2 includes an RTB instruction 231 at the end thereof.

As the user program 24 is executed, the instructions are sequentially prefetched into the instruction buffer 3. In the initial state, the overall area of the instruction buffer 3 constitutes the region BO. As a result, the prefetch and replace operations are achieved in the entire area of the instruction buffer 3 so that the GIB instruction 241 is read therefrom into the instruction register 5 (FIG. 17(a)).

When the GIB instruction is executed, a region B1 having a specified size S is reserved, namely, "1" is set to the region number field 422 of entries of the address correspondence table 42 corresponding to the required number of instruction buffer blocks. Thereafter, the ordinary prefetch and replace operations are inhibited in these regions. Subsequently, when the PFB instruction 242 of the user program 24 is executed, the system library L 23 is transferred from the main memory 2 into the instruction buffer region B1 (FIG. 17(b)). After this point, up to the time when the FIB instruction 245 is executed, the system library L 23 is resident in the region B1 and the library need not be read from the main memory 2.

Each time the JSB instruction 243 to call the library L is executed, "1" is set to BIR 11 and the sequential instructions $l_1$, $l_2$, etc. are directly read from the region B1 of the instruction buffer 3 (FIG. 17(c)). At the end of the library L, when the RTB instruction 231 is executed, BIR 11 is reset to "0" so as to read the subsequent instruction sequence of the user program (FIG. 17(d)).

Finally, when the FIB instruction 245 is executed, the region B1 is freed by resetting to "0" the region number field 143 of the pertinent instruction block, and the overall instruction buffer 3 is restored to the region B0 and the replacement is allowed in this region (FIG. 17(e)).

In a case where the system library is set as a resident program by an instruction in a loop of instructions and the instruction is of a size for which the capture operation is achieved, a call and a return are repeatedly conducted between the captured instruction loop and the resident library which fully develops the advantages of the present invention. That is, in the instruction buffer, the system library which has a small size and which is to be repeatedly employed is kept as a resident program, it is possible to increase the hit ratio with an instruction buffer having a small capacity.

Since simple rules are only required to use the various instructions such as the GIB and PFB instructions to perform processing using the instruction buffer regions, it is also easy to produce a compiler which compiles a program written in a high-level language without taking these functions into consideration into a program of object codes employing such functions. By use of such a compiler, even when the user describes a program in a high-level language without paying attention to the functions above, it is possible to utilize these functions in a simple fashion.

According to the first configuration of the present invention, the procedure instructions on the called side are stored, there does not exist any fear that the procedure instructions of the calling side are replaced. As a result, a group of prefetched instructions to be executed after a return in the procedure of the caller side are reserved in the instruction buffer so as to be read therefrom immediately after the return. Furthermore, the instruction loop including the procedure-call instruction can be captured regardless of the size of the procedure on the called side.

In addition, according to the second configuration of the present invention, a procedure of a relatively small size to be repeatedly called for execution can be set as a resident program in the instruction buffer, which eliminates the operation to read the procedure from the main memory for each call of the procedure.

As a result, for a program including a procedure call and a return therefrom, the hit ratio is greatly improved and a high processing speed is developed without extremely increasing the capacity of the instruction buffer While the present invention has been described with reference to the particular illustrative embodiments, it is not restricted by those embodiments but only by the appended claims. It is to be appreciated that those who skilled in the art may change and modify the embodiments without departing from the scope and spirit of the present invention.

We claim:

1. An apparatus in a computer system having a process and a main memory comprising:
   (a) an instruction buffer divided into a plurality of buffer banks for storing instructions to be executed by an execution unit in said processor;
   (b) an instruction register coupled to said instruction buffer for storing an instruction read out from said instruction buffer;
   (c) an instruction decoder coupled to said instruction buffer for decoding the instruction stored in said instruction register;
   (d) an instruction buffer bank selector coupled to said instruction decoder for changing a designation of one of said buffer banks to be used responsive to an output from said instruction decoder specifying that said instruction stored in said instruction register is a program branch, and for outputting a bank number of the designated bank;
   (e) an instruction address register for storing an address of an instruction to be executed after said instruction of said instruction register is executed; and
   (f) an instruction buffer controller, coupled to said instruction buffer bank selector and said instruction address register, having an address table which specifies a relation between a main memory address and a bank number of said instruction buffer for selecting said address in said instruction address register as an address of said instruction buffer to be read out when said bank number outputted from said instruction buffer bank selector is included in said address table and said address in said instruction address register is included in a buffer bank specified by the bank number stored in said address table and for reading out the address specified by said instruction address register from said instruction buffer and for storing the read out address in said instruction register.

2. An apparatus according to claim 1, wherein:
said buffer banks in said instruction buffer are used in a predetermined order and said instruction buffer bank selector changes a designation of one buffer bank in use to a designation of another buffer bank to be used in said predetermined order responsive to said output from said instruction decoder, said output specifying that the said instruction stored in said instruction register represents a program branch instruction designating an address of a following instruction as a return address and said instruction buffer bank changes the designation of said another buffer bank to be used to designate said one buffer bank previously used in said predetermined order responsive to said output from said instruction decoder, said output specifying that said instruction stored in said instruction register represents a program branch instruction designating returning to said return address.

3. An apparatus according to claim 2, wherein:
said predetermined order of use of said buffer banks is in a loop.

4. An apparatus in a computer system having a processor and a main memory comprising:
(a) an instruction buffer divided into a plurality of areas for storing instructions to be executed by an execution unit in said processor;
(b) an instruction register coupled to said instruction buffer for storing an instruction read out from said instruction buffer;
(c) an instruction decoder coupled to said instruction register for decoding said instruction stored in said instruction register;
(d) a buffer region indication register coupled to said instruction decoder for counting in response to an output of said instruction register up or down from a number identifying a previous area from which instructions were previously processed to identify and store a current number identifying an area from which instructions are to be processed;
(e) an instruction address register for storing an address of an instruction to be executed after said instruction in said instruction register is executed; and
(f) an instruction buffer controller, coupled to said instruction decoder, said buffer region indication register and said instruction address register, having an address table specifying a relation between a main memory address and said number specifying an area of said instruction buffer including means for reserving an area of said instruction buffer identified by said number stored in said designation register and storing an address of said main memory in which an instruction to be stored in said reserved area of said instruction buffer is stored and means for transferring said instruction to be stored in the reserved area of said instruction buffer from said main memory to said area of said instruction buffer.

5. An apparatus according to claim 4 wherein:
said instruction buffer controller further includes means responsive to an output from said instruction decoder for releasing said reserved area of said instruction buffer and clearing said number stored in said address table identifying said reserved area.

6. An apparatus according to claim 4 wherein:
said instruction buffer controller further includes means for searching for an instruction addressed by said address stored in said instruction address register from said reserved area in said instruction buffer.

7. A computer system comprising an instruction buffer divided into a plurality of buffer banks with a buffer bank storing a sequence of instructions to be executed by a processor including a jump to a subroutine instruction and a return form subroutine instruction comprising:
an instruction decoder for decoding instructions retrieved from storage within said system; and
an instruction buffer bank selector coupled to said instruction decoder for generating an address of a current buffer bank from which instructions are currently to be executed by said processor with the instruction buffer bank selector generating an address of said current buffer bank from an address of a previous buffer bank from which instructions have been executed by adding a first predetermined number to said address of said previous buffer bank in response to the decoder decoding a jump to subroutine instruction and by adding a second predetermined number to said address of said previous buffer bank in response to the decoder decoding a return from subroutine instruction; and wherein
said instruction buffer bank comprises an up down counter which counts in one direction in response to decoding a jump to subroutine instruction by said decoder to generate said address of said current buffer from said address of the previous buffer bank and which counts in another direction in response to decoding a return from subroutine instruction by the decoder to generate said address of said current buffer from said address of said previous buffer.

8. A computer in accordance with claim 7 wherein:
said first predetermined number is a $+1$ and said second predetermined number is a $-1$.

9. A computer system in accordance with claim 7 further comprising:
an address correspondence table having an entry associated with each buffer bank with each entry including an address of a first position of an instruction group stored in said main memory and a correlation of said address of said first position with buffer bank storing said instruction group.

10. A computer system comprising an instruction buffer divided into a plurality of buffer banks with a buffer bank storing a sequence of instructions to be executed by a processor including a jump to a subroutine instruction and a return form subroutine instruction comprising:
an instruction decoder for decoding instructions retrieved from storage within said system;
an instruction buffer bank selector coupled to said instruction decoder for generating an address of a current buffer bank from which instructions are currently to be executed by said processor with the instruction buffer bank selector generating an address of said current buffer bank from an address of a previous buffer bank from which instructions have been executed by adding a first predetermined number to said address of said previous buffer bank in response to the decoder decoding a jump to subroutine instruction and by adding a second predetermined number to said address of said previous buffer bank in response to the decoder decoding a return from subroutine instruction; and wherein
said first predetermined number is a $+1$ and said second predetermined number is a $-1$; and
said instruction buffer bank comprises an up down counter which counts in one direction in response to decoding a jump to subroutine instruction by said decoder to generate said address of said current buffer from said address of the previous buffer bank and which counts in another direction in response to decoding a return from subroutine instruction by the decoder to generate said address of said current buffer from said address of said previous buffer.

11. A computer system in accordance with claim 10 further comprising:
an address correspondence table having an entry associated with each buffer bank with each entry including an address of a first position of an instruction group stored in said main memory and a correlation of said address of said first position with buffer bank storing said instruction group.

12. A computer system comprising an instruction buffer divided into a plurality of buffer banks with a buffer bank storing a sequence of instructions to be executed by a processor including a jump to a subroutine instruction and a return form subroutine instruction comprising:

an instruction decoder for decoding instructions retrieved from storage within said system;

an instruction buffer bank selector coupled to said instruction decoder for generating an address of a current buffer bank from which instructions are currently to be executed by said processor with the instruction buffer bank selector generating an address of said current buffer bank from an address of a previous buffer bank from which instructions have been executed by adding a first predetermined number to said address of said previous buffer bank in response to the decoder decoding a jump to subroutine instruction and by adding a second predetermined number to said address of said previous buffer bank in response to the decoder decoding a return from subroutine instruction; and an address correspondence table having an entry associated with each buffer bank with each entry including an address of a first position of an instruction group stored in said main memory and a correlation of said address of said first position with buffer bank storing said instruction group.

13. A computer system comprising an instruction buffer divided into a plurality of buffer banks with a buffer bank storing a sequence of instructions to be executed by a processor including a jump to a subroutine instruction and a return form subroutine instruction comprising:

an instruction decoder for decoding instructions retrieved from storage within said system;

an instruction buffer bank selector coupled to said instruction decoder for generating an address of a current buffer bank from which instructions are currently to be executed by said processor with the instruction buffer bank selector generating an address of said current buffer bank from an address of a previous buffer bank from which instructions have been executed by adding a first predetermined number to said address of said previous buffer bank in response to the decoder decoding a jump to subroutine instruction and by adding a second predetermined number to said address of said previous buffer bank in response to the decoder decoding a return from subroutine instruction; and an address correspondence table having an entry associated with each buffer bank with each entry including an address of a first position of an instruction group stored in said main memory and a correlation of said address of said first position with buffer bank storing said instruction group; and wherein said first predetermined number is a $+1$ and said second predetermined number is a $-1$.

* * * * *